(12) United States Patent  
Shibayama

(10) Patent No.: US 12,187,374 B2  
(45) Date of Patent: Jan. 7, 2025

(54) LAMP UNIT

(71) Applicant: SUZUKI MOTOR CORPORATION, Hamamatsu (JP)

(72) Inventor: Takuya Shibayama, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/457,538

(22) Filed: Aug. 29, 2023

(65) Prior Publication Data

US 2024/0101209 A1   Mar. 28, 2024

(30) Foreign Application Priority Data

Sep. 22, 2022   (JP) ................. 2022-150947

(51) Int. Cl.
*B62J 6/026* (2020.01)
*B60Q 1/00* (2006.01)
*B60Q 1/26* (2006.01)
*B62J 6/00* (2020.01)
*B62J 6/02* (2020.01)
(Continued)

(52) U.S. Cl.
CPC ............ *B62J 6/026* (2020.02); *B60Q 1/0058* (2013.01); *B60Q 1/2607* (2013.01); *B62J 6/00* (2013.01); *B62J 6/02* (2013.01); *B62J 6/022* (2020.02); *F21S 43/237* (2018.01); *F21S 43/245* (2018.01); *F21S 43/247* (2018.01); *F21S 43/40* (2018.01); *G02B 6/0008* (2013.01);
(Continued)

(58) Field of Classification Search
CPC ........ B62J 6/055; F21S 43/251; F21S 43/237; F21S 43/30
See application file for complete search history.

(56) References Cited

U.S. PATENT DOCUMENTS

| | | | | |
|---|---|---|---|---|
| 10,088,119 B2 * | 10/2018 | Kobayashi | ............. | G02B 6/001 |
| 2014/0247616 A1 * | 9/2014 | Arrivet | ................. | F21S 43/251 |
| | | | | 362/511 |

(Continued)

FOREIGN PATENT DOCUMENTS

| | | |
|---|---|---|
| CN | 104390186 A | 3/2015 |
| DE | 10 2019 107 356 A1 | 9/2019 |

(Continued)

OTHER PUBLICATIONS

Machine translation of Hosuda et al., WO 2018/180354 A1, published Oct. 4, 2018 (Year: 2018).*

(Continued)

*Primary Examiner* — William N Harris
(74) *Attorney, Agent, or Firm* — Stein IP, LLC

(57) ABSTRACT

A lamp unit for illuminating a front through an outer lens includes a first light source disposed on a back side of the outer lens, a second light source disposed on the back side of the outer lens, a first light guide body configured to guide light from the first light source to the outer lens, and a second light guide body configured to guide light from the second light source to the outer lens. The second light guide body overlaps the first light guide body from a front side in a front view. The first light guide body protrudes outward from the second light guide body. A part of light from the first light guide body is transmitted through the second light guide body and guided to the outer lens.

9 Claims, 7 Drawing Sheets

(51) Int. Cl.
  *B62J 6/022* (2020.01)
  *B62J 6/055* (2020.01)
  *F21S 43/14* (2018.01)
  *F21S 43/237* (2018.01)
  *F21S 43/245* (2018.01)
  *F21S 43/247* (2018.01)
  *F21S 43/40* (2018.01)
  *F21V 8/00* (2006.01)
  *F21W 103/10* (2018.01)
  *F21W 103/20* (2018.01)

(52) U.S. Cl.
  CPC ............... *B62J 6/055* (2020.02); *F21S 43/14* (2018.01); *F21W 2103/10* (2018.01); *F21W 2103/20* (2018.01)

(56) References Cited

U.S. PATENT DOCUMENTS

| | | |
|---|---|---|
| 2015/0292704 A1 | 10/2015 | Koshiro |
| 2017/0327169 A1 | 11/2017 | Kouchi et al. |
| 2019/0285241 A1 | 9/2019 | Ikuta |
| 2019/0293857 A1 | 9/2019 | Martoch et al. |
| 2019/0338907 A1 | 11/2019 | Mi et al. |

FOREIGN PATENT DOCUMENTS

| | | | |
|---|---|---|---|
| JP | 2010-153271 A | 7/2010 | |
| JP | 2012-119277 A | 6/2012 | |
| WO | WO-2017052478 A1 * | 3/2017 | ........... B60Q 1/0035 |
| WO | WO-2018180354 A1 * | 10/2018 | ............. B62J 6/022 |

OTHER PUBLICATIONS

Extended European Search Report dated Jan. 18, 2024, issued by the European Patent Office in corresponding application EP 23194769.8.

* cited by examiner

LAMP UNIT

CROSS-REFERENCE TO RELATED APPLICATIONS

This application is based on Japanese Patent Application No. 2022-150947 filed on Sep. 22, 2022, the contents of which are incorporated herein by way of reference

TECHNICAL FIELD

The present disclosure relates to a lamp unit.

BACKGROUND

In a vehicle of related art, a position lamp and a turn signal lamp are separately formed. Even when the position lamp and the turn signal lamp are integrated, a light emitting surface of an outer lens is formed separately, and a lamp unit is increased in size. For this reason, there has been proposed a lamp unit in which a light emitting surface of an outer lens is shared by incorporating light emitting diode (LED) light sources of two colors (for example, see Patent Literature 1). The lamp unit described in Patent Literature 1 functions as a plurality of types of lamps by selectively causing the LED light sources of two colors to emit light.

Patent Literature 1: JP2012-119277A

However, when the lamp unit described in Patent Literature 1 is caused to function as a separate lamp, even if there is a difference in color of emitted light, light emission feeling such as spread of light and a range of the light emission are similar.

SUMMARY

The present disclosure has been made in view of the above points, and an object of the present disclosure is to provide a lamp unit capable of making a color of emitted light and light emission feeling different when functioning as separate lamps.

In order to solve the above problem, a lamp unit according to an aspect of the present disclosure is a lamp unit for illuminating a front through an outer lens, the lamp unit including: a first light source disposed on a back side of the outer lens; a second light source disposed on the back side of the outer lens; a first light guide body configured to guide light from the first light source to the outer lens; and a second light guide body configured to guide light from the second light source to the outer lens. The second light guide body overlaps the first light guide body from a front side in a front view. The first light guide body protrudes outward from the second light guide body. A part of light from the first light guide body is transmitted through the second light guide body and guided to the outer lens.

DESCRIPTION OF EMBODIMENTS

A lamp unit according to one aspect of the present disclosure illuminates a front side through an outer lens. First and second light sources are installed on a back side of the outer lens of the lamp unit. Light from the first light source is guided to the outer lens by a first light guide body, and light from the second light source is guided to the outer lens by a second light guide body. When viewed from the front, the second light guide body overlaps the first light guide body from a front side. Even though the first and second light guide bodies overlap each other, a part of the light from the first light guide body is transmitted through the second light guide body and is guided to the outer lens. Accordingly, the outer lens common to the first light source and the second light source is used to reduce a size of the lamp unit. In addition, light is guided to the outer lens by the second light guide body near the outer lens. Accordingly, visibility from an inside direction can be improved. In this way, it is possible to improve the visibility of the lamp light by differentiating light emission feeling when the first light source emits light and when the second light source emits light.

EMBODIMENT

Figure 1:
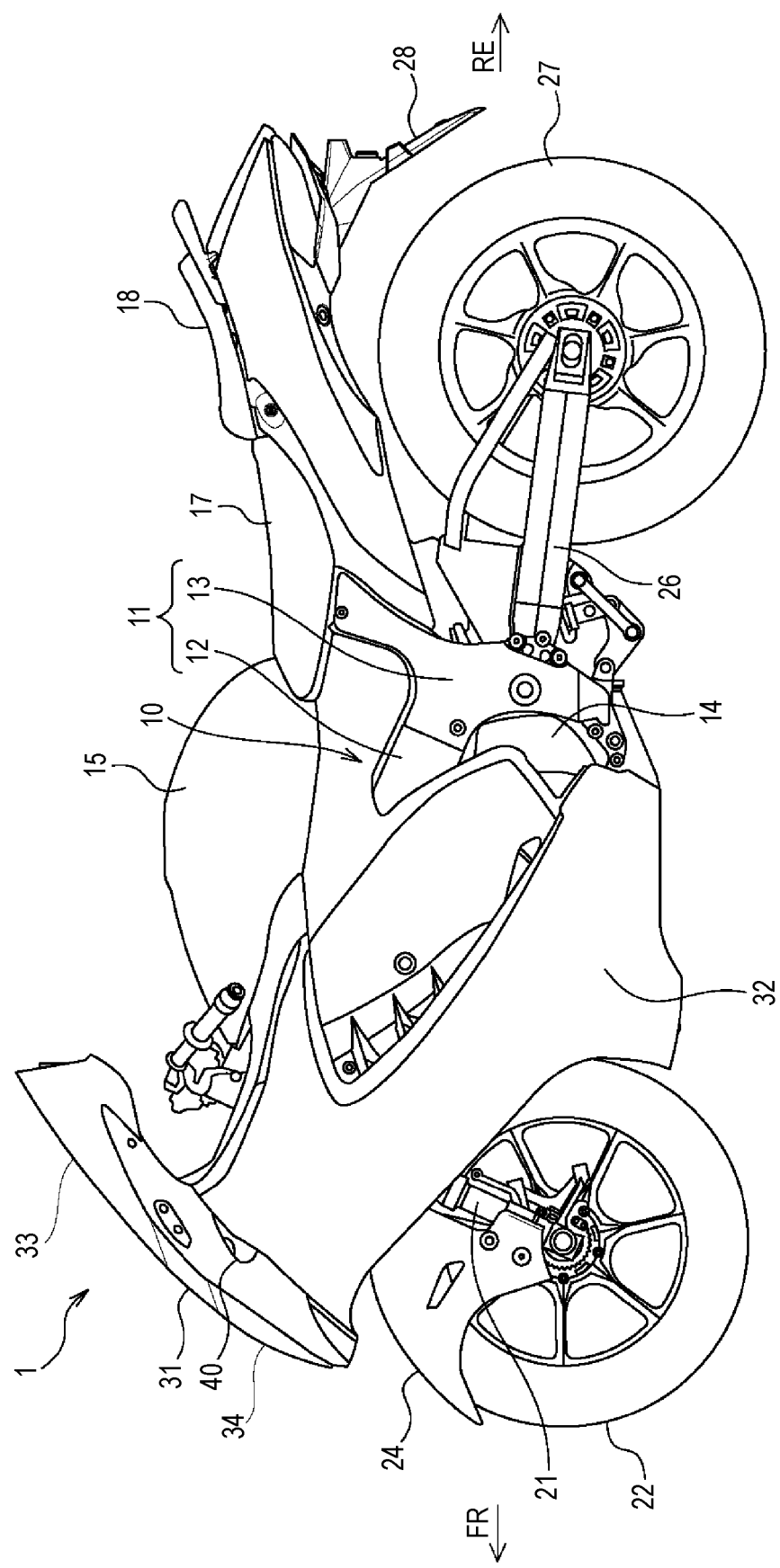
FIG. 1 is a left side view of a straddle-type vehicle according to the present embodiment.

Hereinafter, a straddle-type vehicle in which a lamp unit according to the present embodiment is installed will be described with reference to the accompanying drawings. FIG. 1 is a left side view of a straddle-type vehicle according to the present embodiment. In addition, in the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 includes various components such as an engine 14 and an electrical system mounted on a twin spar type vehicle body frame 10. The vehicle body frame 10 includes a pair of main frames 11 branched from a head pipe (not shown) to the left and right and extending rearward, and a pair of down frames (not shown) branched from the head pipe to the left and right and extending downward. The pair of main frames 11 are curved so as to pass above the engine 14 and go around behind the engine 14. An upper side and a rear side of the engine 14 are suspended by the pair of main frames 11, and a front side of the engine 14 is suspended by the pair of down frames.

A front portion of the main frame 11 is a tank rail 12 located above the engine 14, and a fuel tank 15 is supported by the tank rail 12. A rear portion of the main frame 11 is a body frame 13 located behind the engine 14, and a swing arm 26 is swingably supported at a substantially middle position of the body frame 13 in an upper-lower direction. A seat rail (not shown) and a back stay extend rearward from an upper portion of the body frame 13. A rider seat 17 and a pillion seat 18 are supported on the seat rails behind the fuel tank 15.

A pair of front forks 21 are steerably supported by the head pipe via a steering shaft (not shown). A front wheel 22 is rotatably supported at a lower portion of the front forks 21, and an upper portion of the front wheel 22 is covered with a front fender 24. The swing arm 26 extends rearward from the body frame 13. A rear wheel 27 is rotatably supported at a rear end of the swing arm 26, and an upper portion of the rear wheel 27 is covered with a rear fender 28. The engine 14 is coupled to the rear wheel 27 via a chain drive type transmission mechanism, and power from the engine 14 is transmitted to the rear wheel 27 via the transmission mechanism.

The straddle-type vehicle 1 is covered with various covers as a vehicle body exterior. For example, a front side of a vehicle front portion is covered by a front cowl 31, and a lateral side of the vehicle front portion is covered by a pair of side cowls 32. A screen 33 is provided at an upper portion of the front cowl 31, and a headlamp 34 is exposed from a front surface of the front cowl 31. A pair of lamp units 40 functioning as a turn signal lamp and a position lamp are provided on left and right sides of the headlamp 34 respectively. A streamline shape for reducing air resistance received from traveling wind is formed by the vehicle body exterior and the lamp.

In the lamp unit 40, although it is possible to distinguish between light from the turn signal lamp and light from the position lamp based on a difference in color of emitted light, there is a demand for further improvement in distinguishability due to differences in light emission feeling, such as the spread and intensity of the light. Therefore, in the lamp unit 40 according to the present embodiment, light guide paths of the turn signal lamp and the position lamp are made different. When the lamp unit 40 functions as the turn signal lamp, a wide range is illuminated, and when the lamp unit 40 functions as the position lamp, a narrow range is illuminated, so that a difference in light emission feeling is clear.

Figure 2:
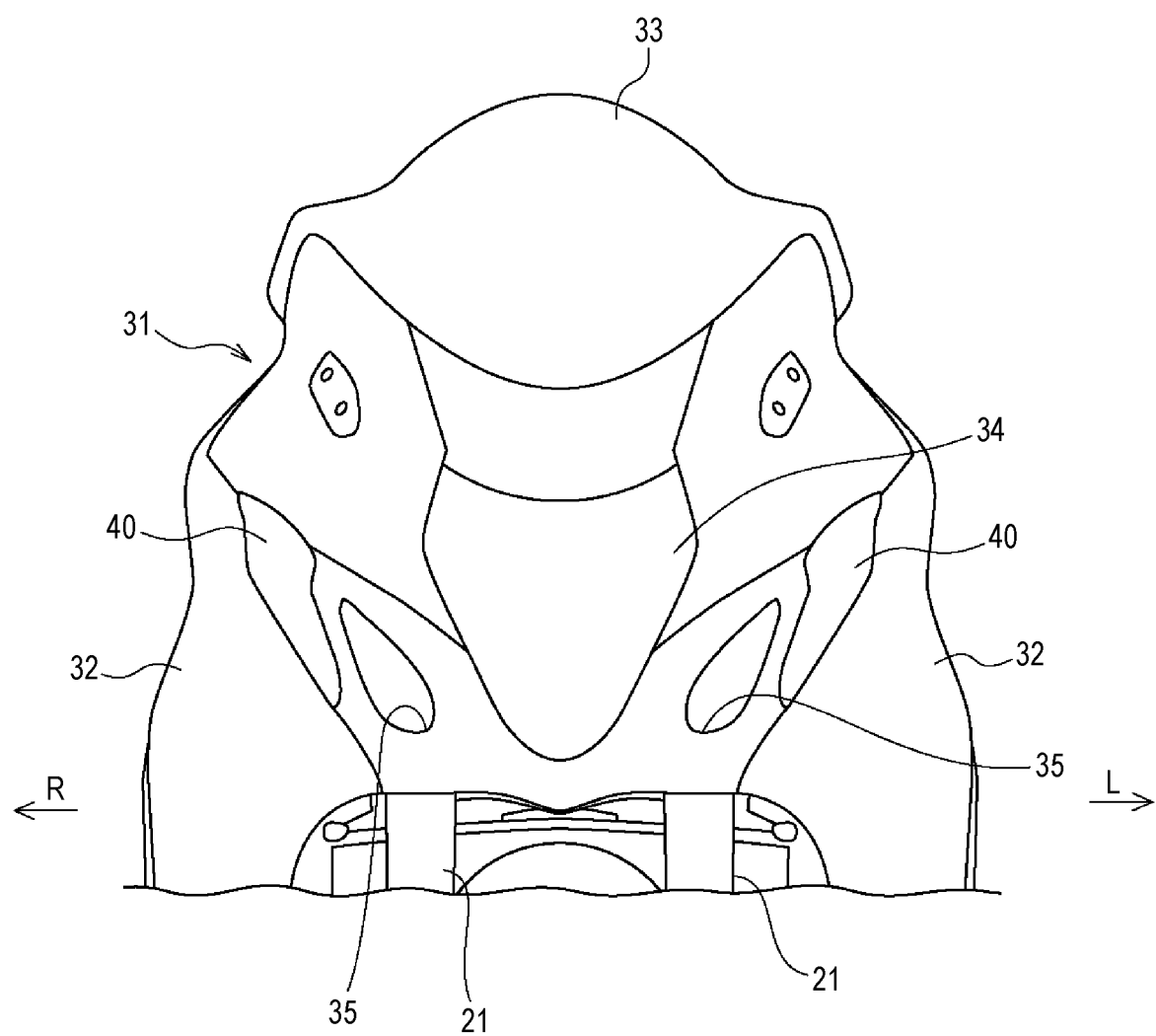
FIG. 2 is a front view of a vehicle front portion of the present embodiment.
Figure 3:
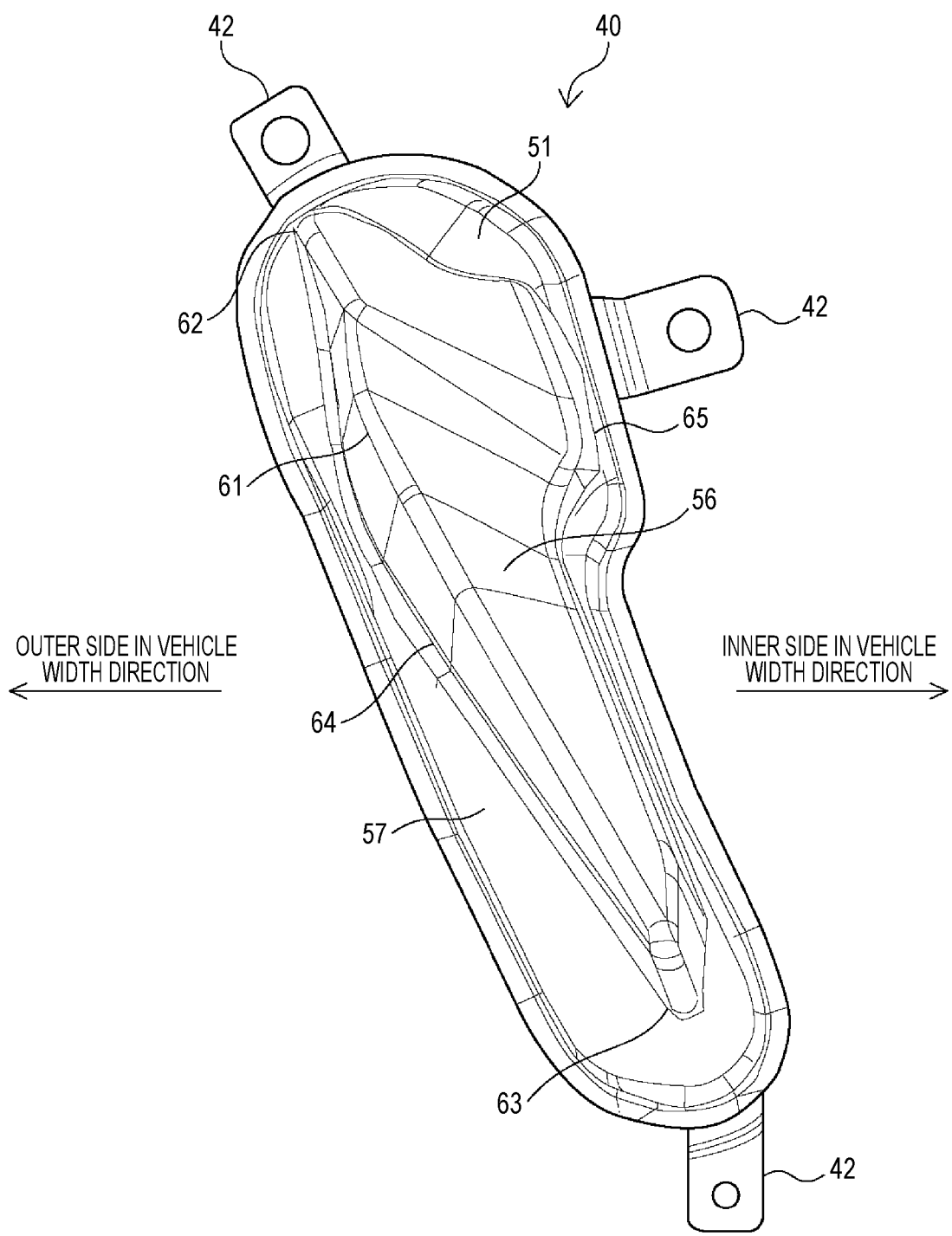
FIG. 3 is a front view of a lamp unit according to the present embodiment.
Figure 4:
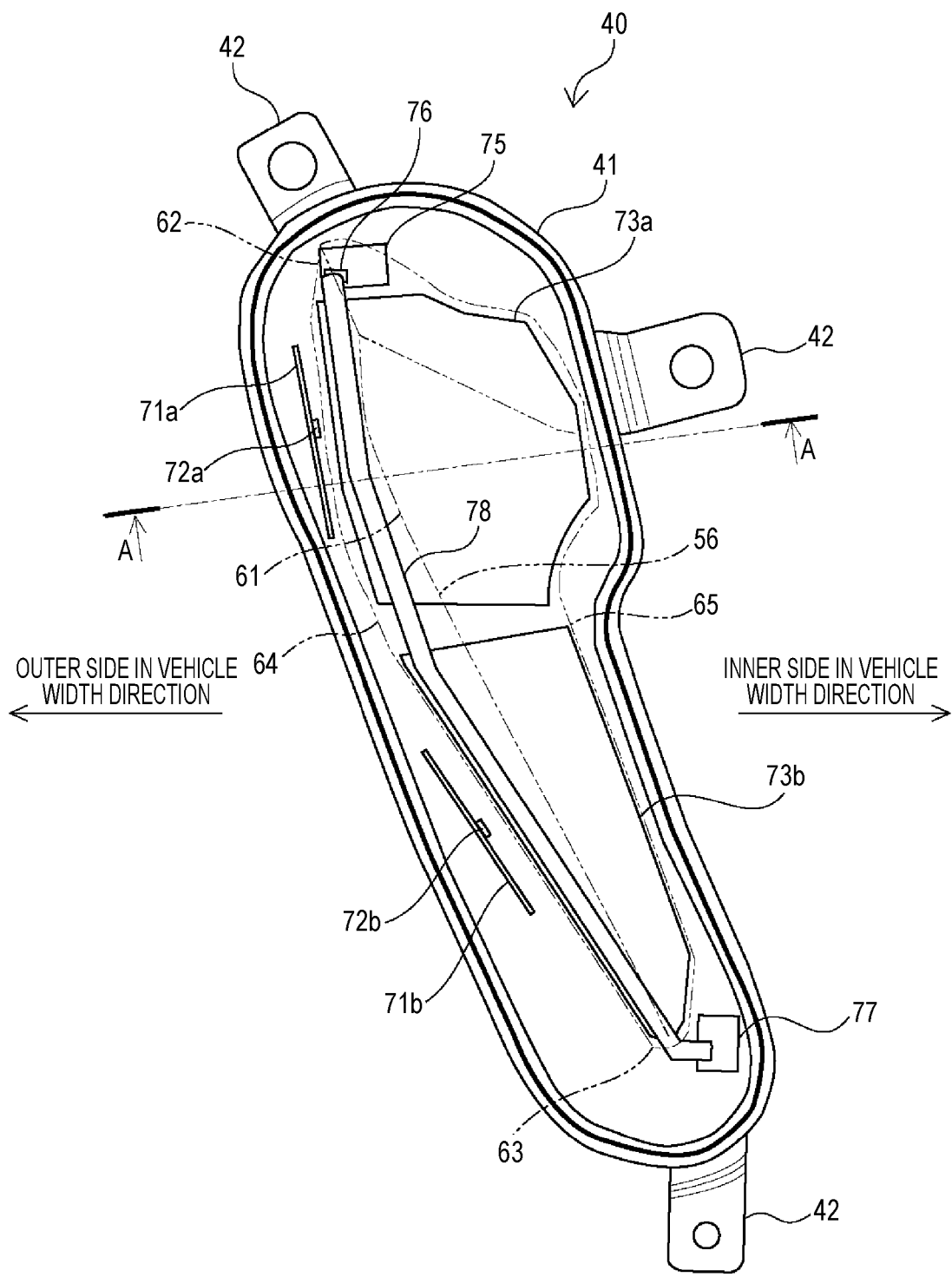
FIG. 4 is a front view of the lamp unit according to the present embodiment from which an outer lens is removed.
Figure 5:
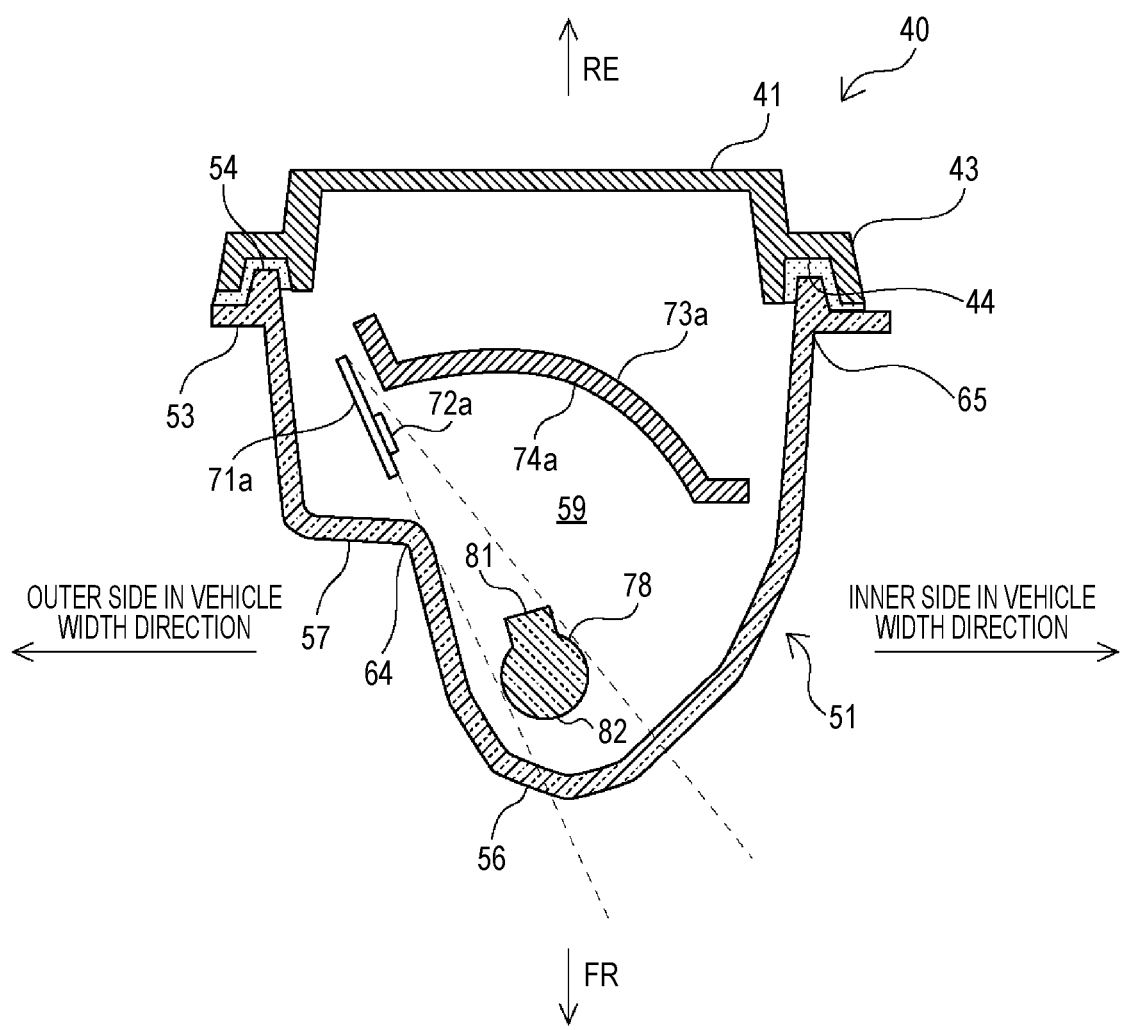
FIG. 5 is a sectional view of the lamp unit in FIG. 4 taken along a line A-A.

Hereinafter, the lamp unit according to the present embodiment will be described with reference to FIG. 2. FIG. 2 is a front view of the vehicle front portion of the present embodiment. FIG. 3 is a front view of the lamp unit according to the present embodiment. FIG. 4 is a front view of the lamp unit according to the present embodiment from which an outer lens is removed. FIG. 5 is a sectional view of the lamp unit in FIG. 4 taken along a line A-A. In FIG. 4, a light emitting surface of the outer lens is indicated by a two-dot chain line for convenience of description.

As shown in FIG. 2, the windbreak screen 33 is provided at the upper portion of the front cowl 31, and the pair of side cowls 32 covering lateral sides of the front forks 21 are provided at a left edge and a right edge of the front cowl 31. The front cowl 31 is formed so as to cover a base end side of the screen 33 and to cover the periphery of the center headlamp 34. The pair of lamp units 40 and a pair of openings 35 are formed between the front cowl 31 and the pair of side cowls 32. The lamp unit 40 extends obliquely upward in an elongated shape from an inner side in a vehicle width direction toward an outer side in the vehicle width direction in a front view, and extends obliquely upward from the vehicle front side toward the vehicle rear side in a side view (see FIG. 1).

As shown in FIG. 3, the lamp unit 40 is configured such that an outer lens 51 is mounted on a front opening of a housing 41 (see FIG. 4) and the front side is illuminated through the outer lens 51. Three fixing portions 42 protrude from an outer edge of the housing 41, and the lamp unit 40 is fixed to a vehicle body via the fixing portions 42. The outer lens 51 is formed in a stepped shape by a light emitting surface 56 bulging forward and a flat surface 57 around the light emitting surface 56. The light emitting surface 56 of the outer lens 51 is exposed from the cowl, and the flat surface 57 of the outer lens 51 and the housing 41 are covered with the cowl from the outside.

The light emitting surface 56 of the outer lens 51 is formed in a mountain shape, and a ridgeline 61 of the light emitting surface 56 extends inward in the vehicle width direction from an upper vertex 62 toward a lower vertex 63. A mountain edge 64 of the light emitting surface 56 on the outer side in the vehicle width direction is curved in an arc shape from an upper vertex 62 and to a lower vertex 63. A mountain edge 65 of the light emitting surface 56 on the inner side in the vehicle width direction is inclined downward from the upper vertex 62 toward the inner side in the vehicle width direction, and then extends substantially downward toward the lower vertex 63. The ridgeline 61 of the light emitting surface 56 is close to the mountain edge 64 on the outer side in the vehicle width direction, and inclination of the light emitting surface 56 on the outer side in the vehicle width direction is larger than inclination of the light emitting surface 56 on the inner side in the vehicle width direction across the ridgeline 61.

As shown in FIG. 4, in the housing 41 of the lamp unit 40, first light source substrates 71a and 71b are installed along the mountain edge 64 on the outer side in the vehicle width direction of the light emitting surface 56, and a second light source substrate 75 is installed in the vicinity of the upper vertex 62 of the light emitting surface 56. First light sources 72a and 72b of the first light source substrates 71a and 71b function as a light source of a turn signal lamp that is turned on when the vehicle changes a course or turns right or left. In the present embodiment, amber LEDs are used as the first light sources 72a and 72b. A second light source 76 of the second light source substrate 75 functions as a light source of a position lamp that is turned on during traveling. In the present embodiment, a white LED is used as the second light source 76.

Further, in the housing 41 of the lamp unit 40, reflectors (first light guide bodies) 73a and 73b are installed on the inner side in the vehicle width direction of the first light source substrates 71a and 71b, and a transparent light guide rod (second light guide body) 78 is installed from the second light source substrate 75 to a mounting substrate 77 below the lamp. The reflectors 73a and 73b are installed on a back side of the light emitting surface 56, and amber light from the first light sources 72a and 72b is reflected toward the light emitting surface 56 by the reflectors 73a and 73b. The light guide rod 78 is installed near the outer side in the vehicle width direction of the light emitting surface 56, and white light from the second light source 76 is emitted toward the light emitting surface 56 by the light guide rod 78.

When viewed from the front, the light guide rod 78 overlaps with the reflectors 73a and 73b from the front side, and the reflectors 73a and 73b protrude inward in the vehicle width direction (outward) from the light guide rod 78. At this time, a part of the amber light from the reflectors 73a and 73b is transmitted through the light guide rod 78 and guided to the outer lens 51, and the light guide rod 78 does not block the amber light even though the light guide rod 78 overlaps the reflectors 73a and 73b. Therefore, an illumination range of the amber light is wider than an illumination range of the white light.

Thus, when the first light sources 72a and 72b emit light (when the turn signal lamp is turned on), amber light is emitted from the light emitting surface 56 as a whole. When the second light source 76 emits light (when the position lamp is turned on), white light is partially emitted from the outer side in the vehicle width direction of the light emitting surface 56. By switching light emission of the light sources, the lamp unit 40 functions as the turn signal lamp and the position lamp. In addition, the first light sources 72a and 72b and the second light source 76 are installed on a back side of the outer lens 51, and the outer lens 51 common to the turn signal lamp and the position lamp is used to reduce the size of the lamp unit 40.

As shown in FIG. 5, the outer edge of the housing 41 widens in a flange shape, and an annular recessed portion 44 is formed in a flange 43 of the housing 41. An outer edge of the outer lens 51 also widens in a flange shape, and an annular protruding portion 54 is formed on a flange 53 of the outer lens 51. The annular protruding portion 54 of the outer lens 51 enters the annular recessed portion 44 of the housing 41, a gap between the annular recessed portion 44 and the annular protruding portion 54 is filled with an adhesive, and the outer edge of the outer lens 51 is bonded to the outer edge of the housing 41 over the entire circumference. In this manner, the outer lens 51 is attached to the housing 41 to form a lamp chamber 59 of the lamp unit 40.

The outer side in the vehicle width direction of the light emitting surface 56 of the outer lens 51 is formed in a stepped shape by the flat surface 57 and the flange 53. The first light source substrate 71a is accommodated on a back side of the flat surface 57 in a front stage, and a surface of the first light source substrate 71a faces inward in the vehicle width direction. As described above, since the flat surface 57 is covered with the side cowls 32 (see FIG. 2) from the front side, the first light source substrate 71a (the first light source 72a) is less noticeable from the front side. The reflector 73a is installed on the inner side in the vehicle width direction of the first light source substrate 71a. A reflecting surface 74a of the reflector 73a is formed in a parabolic shape so as to direct the amber light from the first light source 72a toward the light emitting surface 56.

The light guide rod 78 is installed near the light emitting surface 56 in front of the reflector 73a. A fine reflection groove (not shown) is formed on a back surface 81 of the light guide rod 78 so as to direct the white light in the light guide rod 78 toward the light emitting surface 56. Further, the back surface 81 of the light guide rod 78 is formed so as to be able to transmit a part of the amber light reflected from the reflector 73a. Therefore, reflected light from the reflector 73a is less likely to be blocked by the light guide rod 78. The light guide rod 78 overlaps the first light source substrate 71a obliquely from the front side, and an exposed range of the first light source substrate 71a is narrowed, so that the first light source substrate 71a (the first light source 72a) becomes inconspicuous, and the appearance of the lamp unit 40 is improved.

Figure 6A:
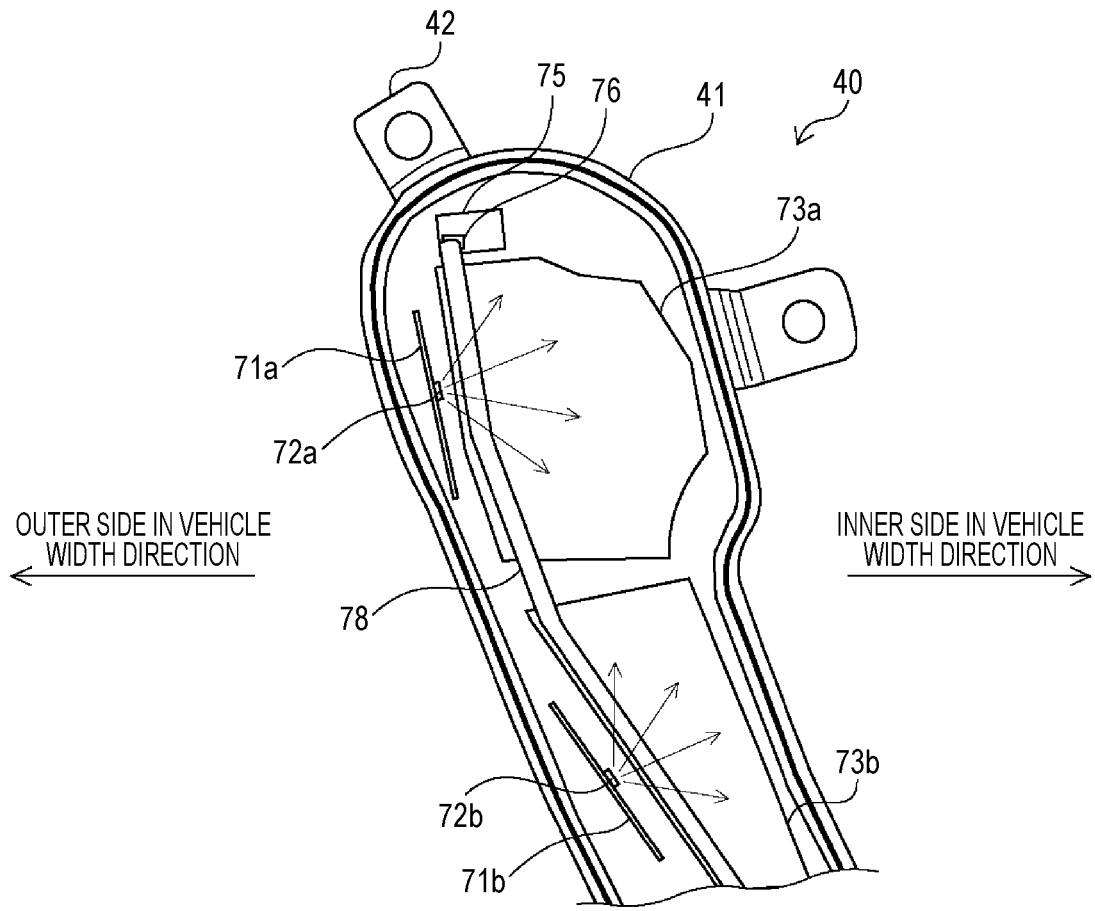
FIGS. 6A and 6B are views showing an illumination state with the lamp unit according to the present embodiment functioning as a turn signal lamp.
Figure 6B:
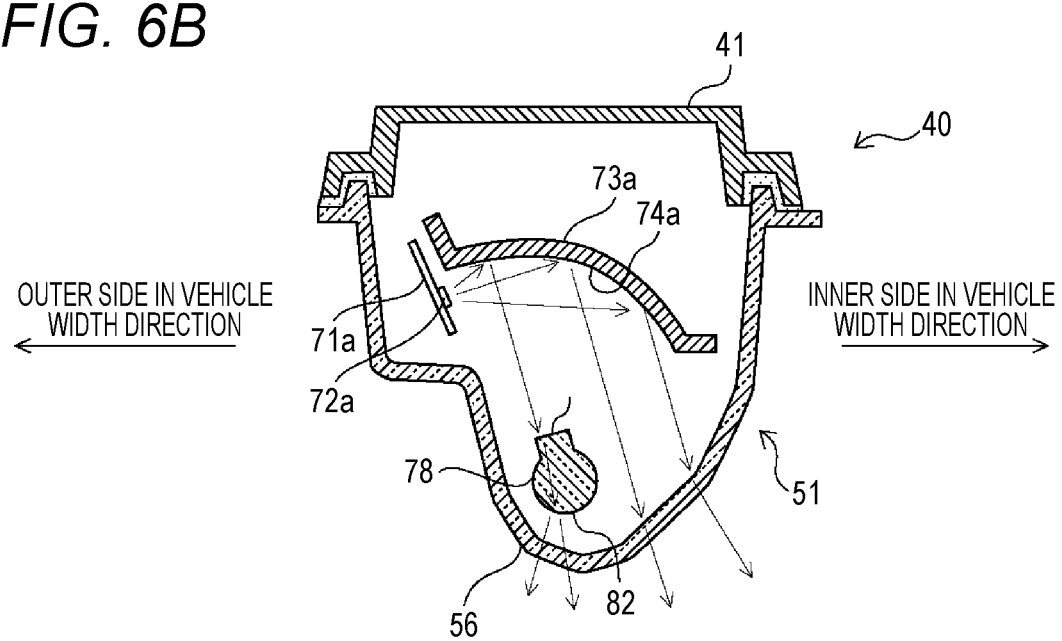
Figure 7A:
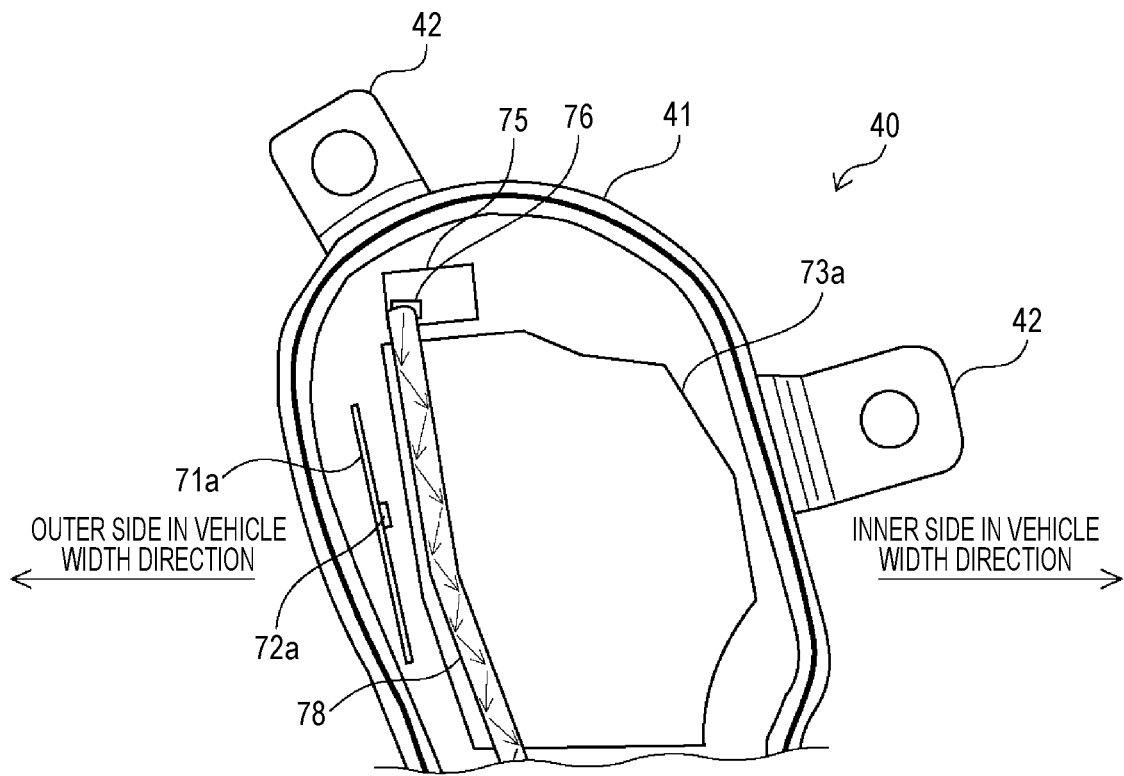
FIGS. 7A and 7B are views showing an illumination state with the lamp unit according to the present embodiment functioning as a position lamp.
Figure 7B:
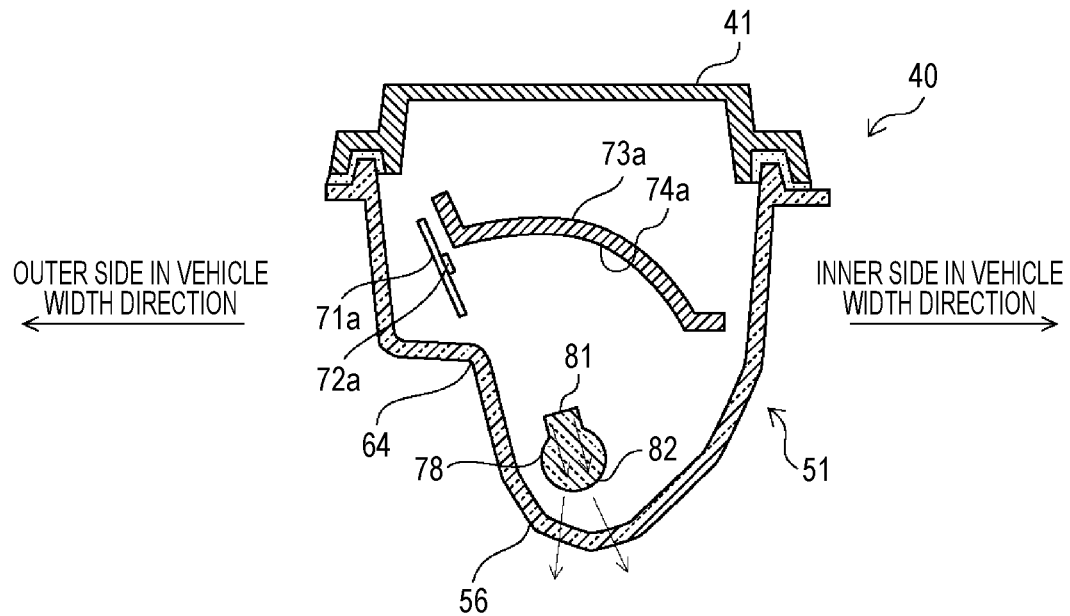

An illumination state of the lamp unit will be described with reference to FIGS. 6A to 7B. FIGS. 6A and 6B are views showing an illumination state with the lamp unit according to the present embodiment functioning as the turn signal lamp. FIGS. 7A and 7B are views showing an illumination state with the lamp unit according to the present embodiment functioning as the position lamp. FIGS. 6A and 7A show illumination states as viewed from the front, and FIGS. 6B and 7B show illumination states as viewed from a cross-section.

As shown in FIGS. 6A and 6B, when the lamp unit 40 is turned on as the turn signal lamp, amber light is emitted from the first light sources 72a and 72b to the reflectors 73a and 73b from the lateral side. The amber light is reflected toward the light emitting surface 56 of the outer lens 51 by the reflecting surfaces 74a and 74b of the reflectors 73a and 73b. Most of the reflectors 73a and 73b protrude inward in the vehicle width direction from the light guide rod 78, and reflected light from a protruding portion of the reflectors 73a and 73b is directly emitted toward the light emitting surface 56. Reflected light from a part of the reflectors 73a and 73b overlapping the light guide rod 78 is transmitted through the light guide rod 78 and is emitted toward the light emitting surface 56.

Therefore, the light emitting surface 56 of the outer lens 51 is entirely illuminated by the amber light from the first light sources 72a and 72b. At this time, the reflectors 73a and 73b are separated from the light emitting surface 56 and the amber light is reflected toward the entire light emitting surface 56 by the reflectors 73a and 73b, so that the light emitting surface 56 is uniformly and gently illuminated from the back side with the amber light. When the lamp unit 40 functions as the turn signal lamp, it is possible to obtain light emission feeling in which the light emitting surface 56 is illuminated in amber color, and amber light is emitted from the light emitting surface 56 to a wide range.

As illustrated in FIGS. 7A and 7B, when the lamp unit 40 is turned on as the position lamp, white light is incident on the light guide rod 78 from the second light source 76. The light guide rod 78 extends along the mountain edge 64 on the outer side in the vehicle width direction of the light emitting surface 56, and the white light travels downward from the second light source 76 while repeating total reflection within the light guide rod 78. Since the reflection groove is formed on the back surface 81 of the light guide rod 78, a part of the white light reflected by the back surface 81 of the light guide rod 78 is transmitted through a front surface 82 of the light guide rod 78. The white light is extracted over the entire length of the light guide rod 78, and the white light is emitted from the entire light guide rod 78 toward the light emitting surface 56 of the outer lens 51.

Therefore, the white light from the second light source 76 partially illuminates the light emitting surface 56 of the outer lens 51. At this time, the light guide rod 78 is close to the light emitting surface 56, and the light guide rod 78 emits white light toward the outer side in the vehicle width direction of the light emitting surface 56, so that the light emitting surface 56 is partially illuminated from the back side by the white light. When the lamp unit 40 functions as the position lamp, it is possible to obtain light emission feeling in which the light emitting surface 56 is illuminated in white color, and white light is emitted from the light emitting surface 56 to a narrow range. Thus, the light emission feeling is greatly different between the amber light and the white light.

As described above, the light emitting surface 56 of the lamp unit 40 is exposed from the front cowl 31 (see FIG. 2), and the front cowl 31 protrudes forward toward the center in the vehicle width direction. The light guide rod 78 is positioned on the front side of the light emitting surface 56 close to the outer lens 51. In other words, the light guide rod 78 is disposed closer to the light emitting surface 56 than the reflectors 73a and 73b. Therefore, light is emitted on the front side close to the outer lens 51 when the first light sources 72a and 72b emit light (when the turn signal lamp is turned on) and when the second light source 76 emits light (when the position lamp is turned on). Therefore, even though the front cowl 31 protrudes forward on the inner side in the vehicle width direction of the light emitting surface 56, light from the light emitting surface 56 is less likely to be blocked by the front cowl 31, and visibility of the turn signal lamp and the position lamp from the inner side in the vehicle width direction is improved.

As described above, according to the lamp unit 40 of the present embodiment, the reflectors 73a and 73b and the light guide rod 78 overlap with each other, and it is possible to reduce the size of the lamp unit 40 by using the outer lens 51 common to the turn signal lamp and the position lamp. In addition, the amber light is guided to the outer lens 51 not only by the portion of the reflectors 73a and 73b protruding outward from the light guide rod 78 but also by the portion of the reflectors 73a and 73b overlapping the light guide rod 78. Accordingly, when the turn signal lamp is turned on, a wide range is illuminated by the lamp unit 40. White light is guided to the outer lens 51 by the light guide rod 78 near the outer lens 51. Accordingly, when the position lamp is turned on, a narrow range is illuminated by the lamp unit 40. In this way, the visibility of the lamp light can be improved by differentiating the light emission feeling between the turn signal lamp and the position lamp.

In the present embodiment, the lamp unit functions as a front turn signal lamp and a front position lamp, and the lamp unit may also function as a rear turn signal lamp and a rear position lamp. In this case, an amber LED may be used as the first light source, and a red LED may be used as the second light source.

In addition, in the present embodiment, the amber light reflected from the reflector is incident on the back surface of the light guide rod, but the amber light may be incident from an end portion of the light guide rod by adding an amber light source. With such a configuration, it is also possible to cause the light guide rod to emit amber light when the turn signal is turned on.

In addition, in the present embodiment, the reflector is exemplified as the first light guide body, and the first light guide body may be anything as long as light from the first light source can be guided to the outer lens. For example, the first light guide body may be a light guide plate or the like.

In addition, in the present embodiment, the light guide rod is exemplified as the second light guide body, and the second light guide body may be anything as long as light from the second light source can be guided to the outer lens. For example, the second light guide body may be a light guide plate or the like.

In addition, in the present embodiment, the light guide rod is installed near the outer side in the vehicle width direction of the light emitting surface, but the light guide rod may be installed in any manner as long as the light guide rod is installed so as to overlap the reflector from the front side.

In addition, the lamp unit according to the present embodiment is not limited to be adopted in a straddle-type vehicle, and may be adopted in other vehicles such as a four-wheeled motor vehicle. The straddle-type vehicle is not limited to a general vehicle in which a driver rides on a seat in a posture straddling the seat, and includes a scooter-type vehicle in which the driver rides on a seat without straddling the seat.

As described above, a lamp unit (40) for illuminating a front through an outer lens (51) includes: a first light source (72a, 72b) disposed on a back side of the outer lens; a second light source (76) disposed on the back side of the outer lens; a first light guide body (reflectors 73a, 73b) configured to guide light from the first light source to the outer lens; and a second light guide body (light guide rod 78) configured to guide light from the second light source to the outer lens, in which the second light guide body overlaps the first light guide body from a front side in a front view, the first light guide body protrudes outward from the second light guide body, and a part of light from the first light guide body is transmitted through the second light guide body and guided to the outer lens. According to this configuration, the first light guide body and the second light guide body overlap with each other, and it is possible to reduce a size of the lamp unit by using the outer lens common to the first light source and the second light source. In addition, light from the first light source is guided to the outer lens not only by a portion of the first light guide body protruding outward from the second light guide body but also by a portion of the first light guide body overlapping the second light guide body. Accordingly, when the first light source emits light, the lamp unit illuminates a wide range. In addition, light from the second light source is guided to the outer lens by the second light guide body near the outer lens. Accordingly, when the second light source emits light, the lamp unit illuminates a narrow range. In this way, it is possible to improve the visibility of the lamp light by differentiating light emission feeling when the first light source emits light and when the second light source emits light.

In the lamp unit, a light emitting surface (56) of the outer lens is exposed from a cowl (front cowl 31) of a vehicle body, and the second light guide body is disposed near a front of the light emitting surface. According to this configuration, even if the cowl of the vehicle body protrudes forward toward the center, the light from the first light guide body is less likely to be blocked by the cowl, and the visibility of the lamp light is improved.

In the lamp unit, the second light guide body overlaps the first light source from the front, and an exposed range of the first light source is narrowed. According to this configuration, the first light source becomes less conspicuous, and appearance of the lamp unit is improved.

In the lamp unit, the first light guide body is a reflector that reflects the light from the first light source to the outer lens, and the second light guide body is a light guide rod that emits the light from the second light source to the outer lens. According to this configuration, light emission feeling of the lamp unit can be made different by the reflector and the light guide rod.

In the lamp unit, the first light source functions as a light source of a turn signal lamp, and the second light source functions as a light source of a position lamp. According to this configuration, the position lamps inform the surroundings of the presence of the own vehicle, and are effectively provided on both left and right sides of the vehicle body in the same manner as the turn signal lamps. Therefore, the functions of both the turn signal lamp and the position lamp can be integrated.

Although the present embodiment has been described, as another embodiment, the above-described embodiment and modifications may be combined entirely or partially.

In addition, the technique of the present disclosure is not limited to the above-described embodiment, and various changes, replacements, and modifications may be made without departing from the gist of the technical concept. Furthermore, as long as the technical concept can be achieved in another way by the progress of the technique or another derivative technique, the present disclosure may be implemented using the method. Therefore, the claims cover all embodiments that may fall within the scope of the technical concept.

What is claimed is:

1. A lamp unit for illuminating a region in front of the lamp unit through an outer lens, the lamp unit comprising:
   a first light source disposed on a back side of the outer lens;
   a second light source disposed on the back side of the outer lens;

a first light guide body configured to guide light from the first light source to the outer lens; and a second light guide body configured to guide light from the second light source to the outer lens, wherein the second light guide body overlaps the first light guide body from a front side in a front view, wherein the first light guide body protrudes outward from the second light guide body, and wherein a part of light from the first light guide body is transmitted through the second light guide body and guided to the outer lens, and wherein the first light guide is disposed on an inner side of the first light source in a vehicle width direction.

2. The lamp unit according to claim 1,
wherein a light emitting surface of the outer lens is exposed from a cowl of a vehicle body, and
wherein the second light guide body is disposed near a front of the light emitting surface.

3. The lamp unit according to claim 1,
wherein the second light guide body overlaps the first light source from the front, and an exposed range of the first light source is narrowed.

4. The lamp unit according to claim 1,
wherein the first light guide body is a reflector that reflects the light from the first light source to the outer lens, and
wherein the second light guide body is a light guide rod that emits the light from the second light source to the outer lens.

5. The lamp unit according to claim 1,
wherein the first light source functions as a light source of a turn signal lamp, and wherein the second light source functions as a light source of a position lamp.

6. The lamp unit according to claim 1,
wherein a light emitting surface of the outer lens is exposed from a cowl of a vehicle body, and
wherein the second light guide body is disposed closer to the light emitting surface than the first light guide body.

7. The lamp unit according to claim 1,
wherein a light emitting surface of the outer lens is formed in a convex shape and is exposed from a cowl of a vehicle body, and
wherein the first light source is disposed along an edge on an outer side in a vehicle width direction of the light emitting surface, wherein the edge is a boundary of the outer lens from a top view.

8. The lamp unit according to claim 7,
wherein the second light source is disposed in a vicinity of a vertex of the light emitting surface.

9. The lamp unit according to claim 2,
wherein a flat surface is formed in an outer side in the vehicle width direction of the light emitting surface of the outer lens, the flat surface is covered with a side cowl from the front side, and
wherein the first light source is accommodated on a back side of the flat surface.

* * * * *